(12) United States Patent
Pusch et al.

(10) Patent No.: US 9,013,319 B2
(45) Date of Patent: Apr. 21, 2015

(54) VEHICLE INLET FOR USE IN CHARGING A BATTERY OF AN ELECTRIC VEHICLE (EV) OR A HYBRID ELECTRIC VEHICLE (HEV)

(75) Inventors: Reinhard Pusch, Farmington Hills, MI (US); Keith R. Kwasny, Northville, MI (US); John F. Nathan, Highland Township, MI (US)

(73) Assignee: Lear Corporation, Southfield, MI (US)

( * ) Notice: Subject to any disclaimer, the term of this patent is extended or adjusted under 35 U.S.C. 154(b) by 288 days.

(21) Appl. No.: 13/585,248

(22) Filed: Aug. 14, 2012

(65) Prior Publication Data

US 2013/0049972 A1   Feb. 28, 2013

Related U.S. Application Data

(60) Provisional application No. 61/526,459, filed on Aug. 23, 2011.

(51) Int. Cl.
*G08B 21/00* (2006.01)
*B60Q 1/26* (2006.01)
*B60Q 1/50* (2006.01)
*B60L 11/18* (2006.01)

(52) U.S. Cl.
CPC ............. *B60Q 1/2603* (2013.01); *B60Q 1/50* (2013.01); *B60L 11/1818* (2013.01); *B60L 11/1861* (2013.01); *B60L 2240/665* (2013.01); *B60L 2250/16* (2013.01); *Y02T 10/7088* (2013.01); *Y02T 10/7044* (2013.01); *Y02T 10/7005* (2013.01); *Y02T 10/705* (2013.01); *Y02T 90/16* (2013.01); *Y02T 90/121* (2013.01); *Y02T 90/14* (2013.01)
USPC ..................... 340/636.1; 340/815.4; 362/543; 362/545

(58) Field of Classification Search
CPC ............ B60L 11/1818; B60L 2250/16; B60L 3/0053; B60L 3/04; B60Q 9/00; B60Q 1/50; H02J 2007/005; H02J 1/08
USPC ................... 340/686.1, 636.1, 815.4, 815.73; 439/345, 625; 362/545, 543, 800, 253, 362/459
See application file for complete search history.

(56) References Cited

U.S. PATENT DOCUMENTS 5,757,595 A * 5/1998 Ozawa et al. ............... 340/636.1
6,241,550 B1 * 6/2001 Laity et al. ..................... 439/490
(Continued)

FOREIGN PATENT DOCUMENTS

CN         1328718 A       12/2001
CN         200971084 Y     11/2007
(Continued)

OTHER PUBLICATIONS

Chinese Patent Application No. 201210302862.0, Office Action dated May 29, 2014.

*Primary Examiner* — Eric M Blount
(74) *Attorney, Agent, or Firm* — Brooks Kushman P.C.

(57) ABSTRACT

A vehicle inlet is disclosed for use in charging a battery of an electric vehicle or a hybrid-electric vehicle. The vehicle inlet includes a housing, a luminance engine having at least one light emitting diode, and a luminance member configured for attachment to the housing and for cooperation with the luminance engine. The luminance member is adapted for illumination by the at least one light emitting diode of the luminance engine based on an ambient light level having a value less than a threshold for a predetermined time period.

20 Claims, 4 Drawing Sheets

(56) References Cited

U.S. PATENT DOCUMENTS

| | | | |
|---|---|---|---|
| 6,457,843 B1* | 10/2002 | Kester et al. | 362/276 |
| 7,118,379 B1 | 10/2006 | Wang | |
| 7,999,665 B2* | 8/2011 | Chander et al. | 340/455 |
| 8,063,757 B2* | 11/2011 | Frey et al. | 340/455 |
| 8,125,324 B2* | 2/2012 | Frey et al. | 340/455 |
| 8,179,245 B2* | 5/2012 | Chander et al. | 340/455 |
| 8,226,284 B2* | 7/2012 | Markyvech et al. | 362/540 |
| 2009/0072960 A1* | 3/2009 | Kuhnly et al. | 340/450.2 |
| 2010/0204859 A1 | 8/2010 | Kamaga | |
| 2010/0207771 A1 | 8/2010 | Trigiani | |
| 2010/0213847 A1* | 8/2010 | Biondo et al. | 315/82 |
| 2010/0246198 A1* | 9/2010 | Hook et al. | 362/459 |
| 2010/0302781 A1* | 12/2010 | Markyvech et al. | 362/253 |

FOREIGN PATENT DOCUMENTS

| | | |
|---|---|---|
| CN | 101720152 | 6/2010 |
| CN | 101848822 A | 9/2010 |
| FR | 2913643 A1 | 9/2008 |

* cited by examiner

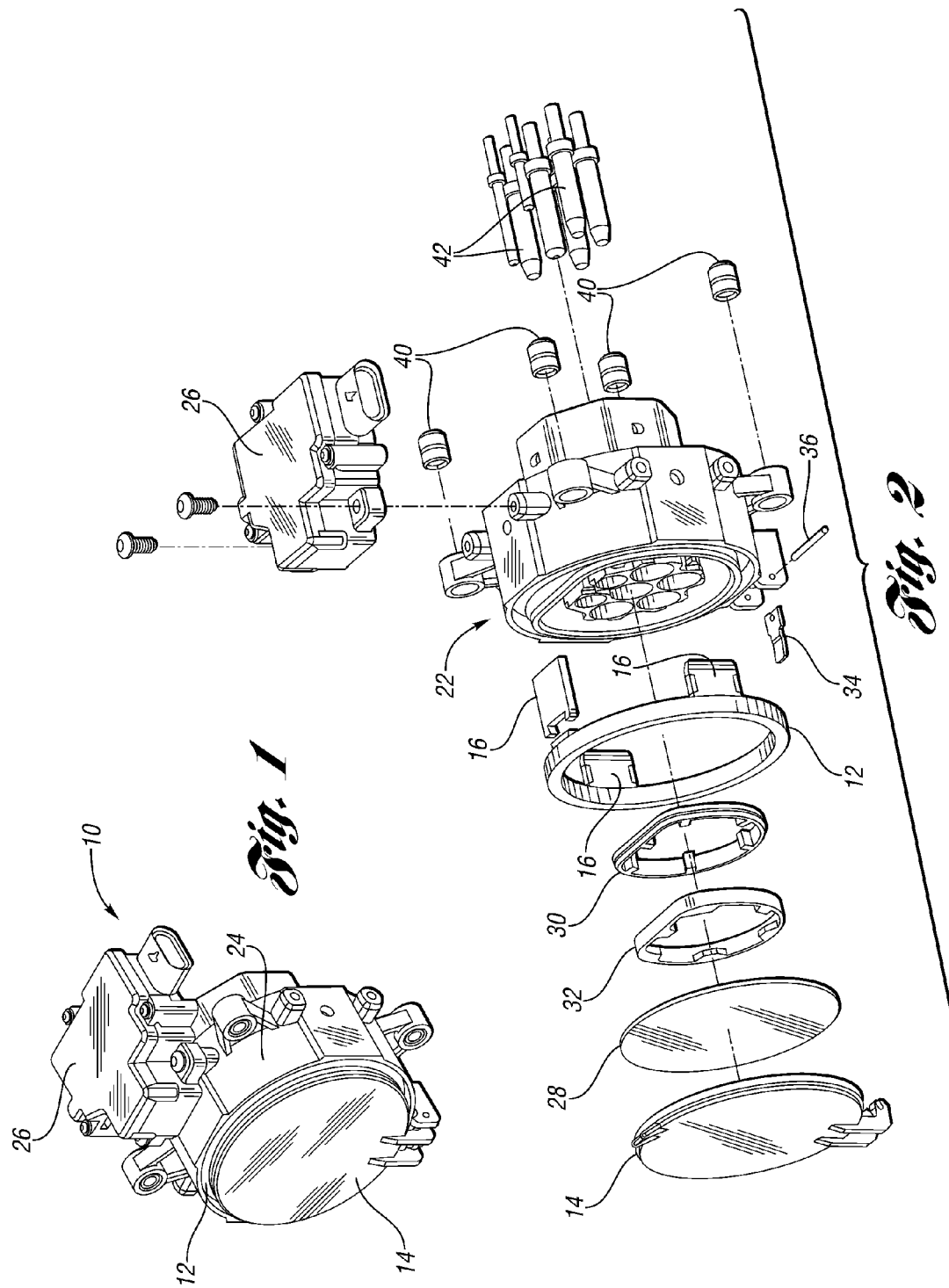

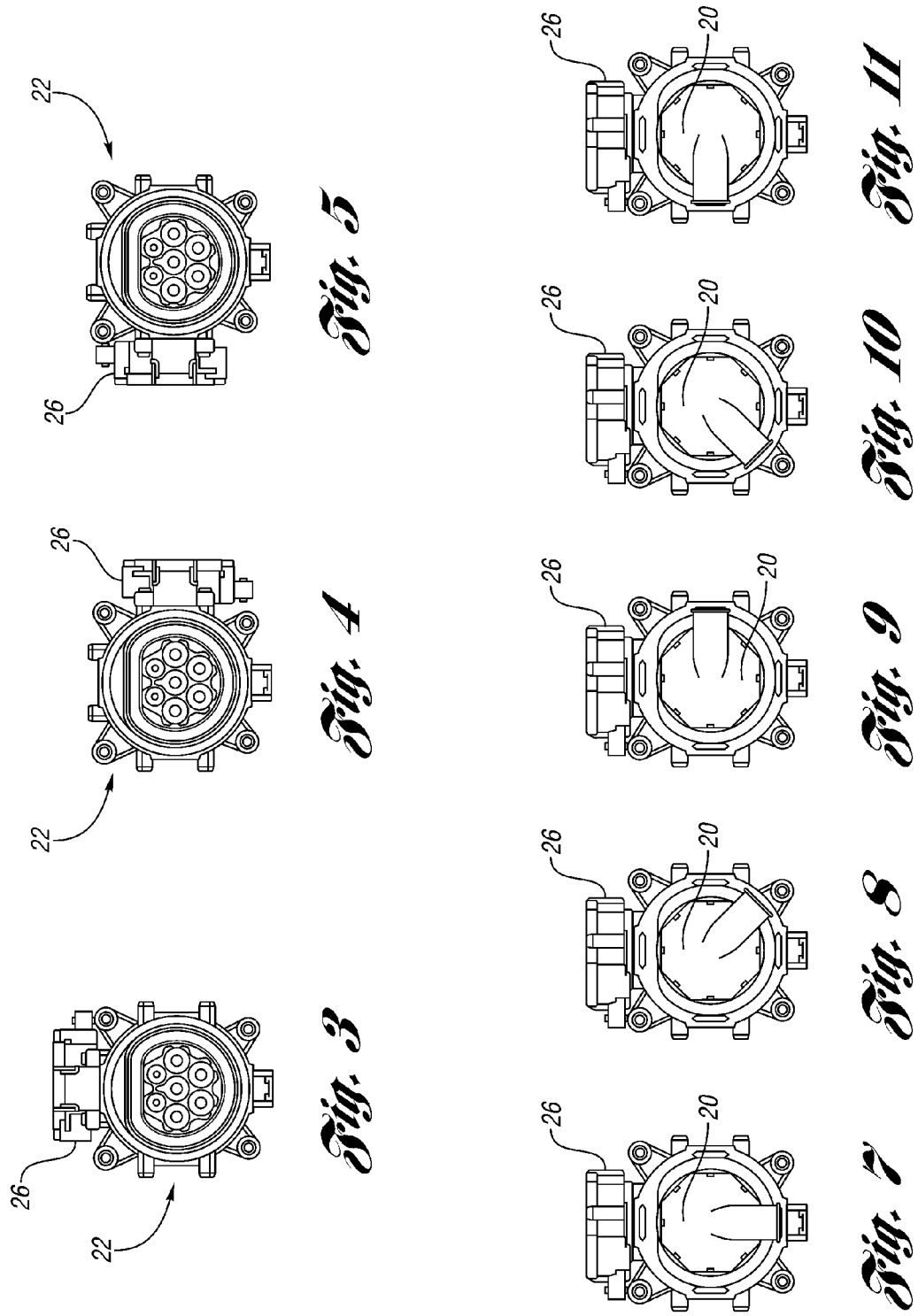

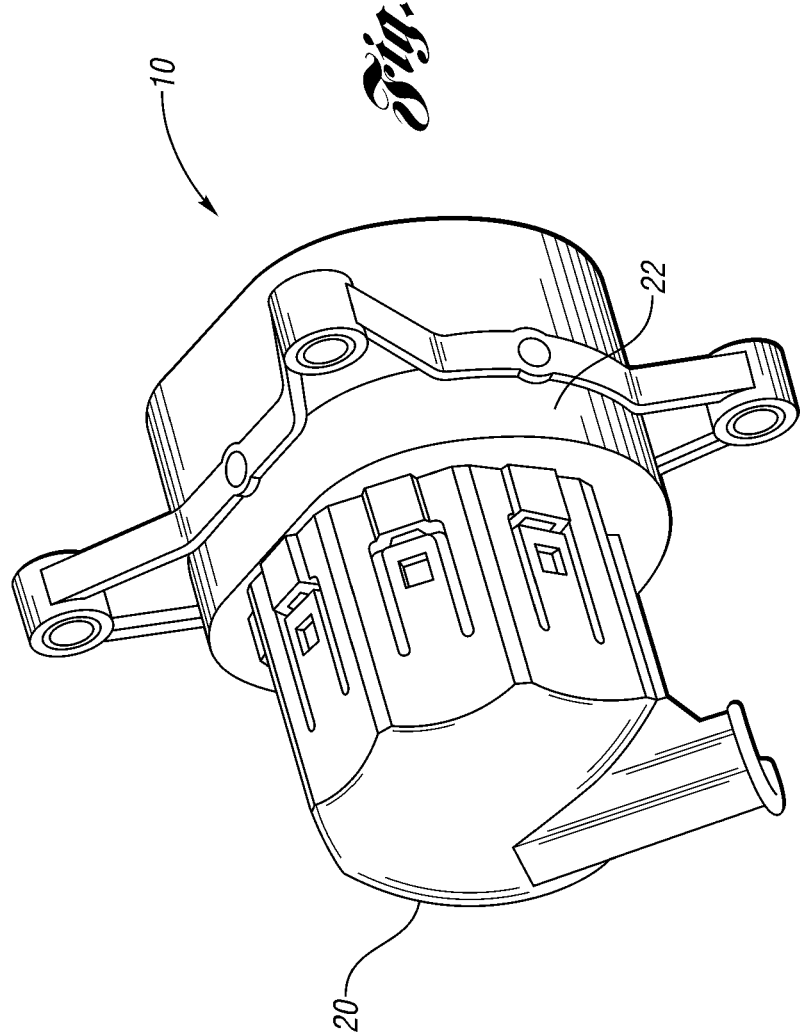

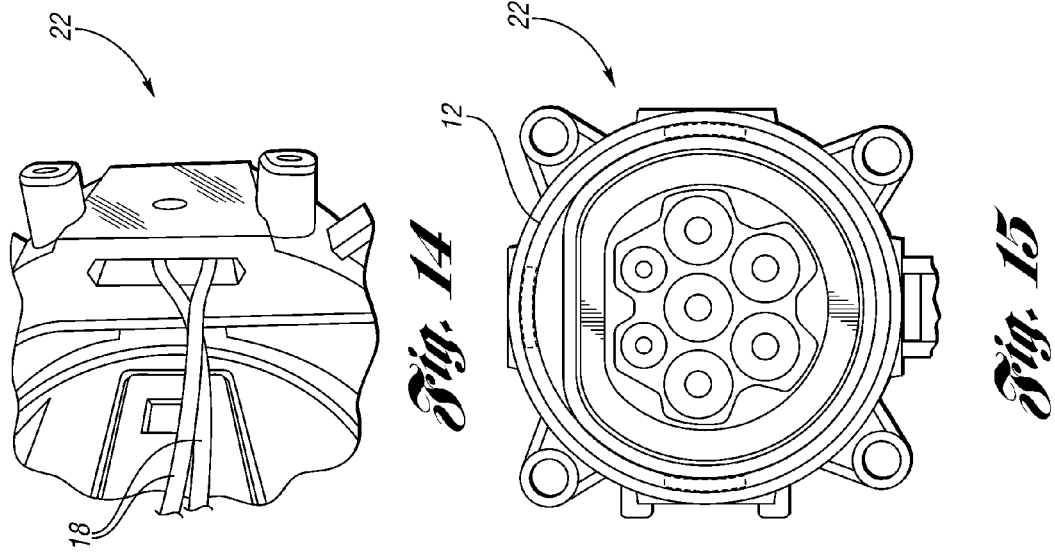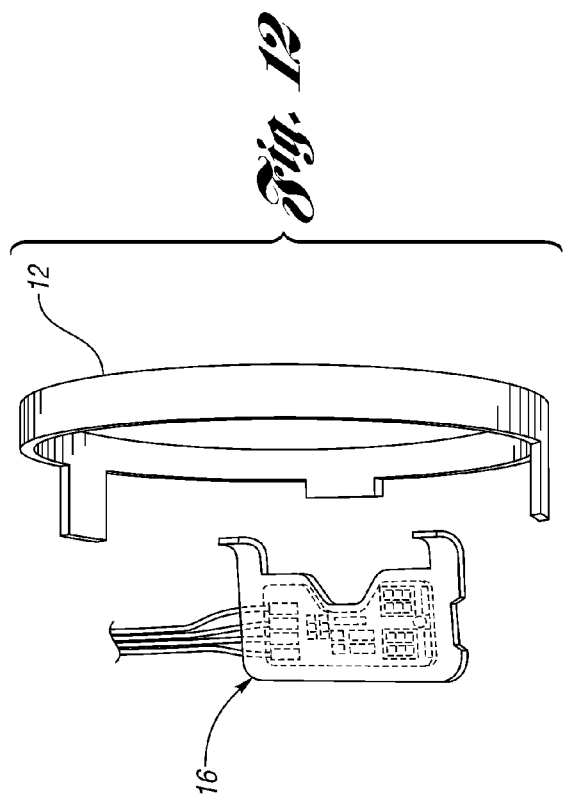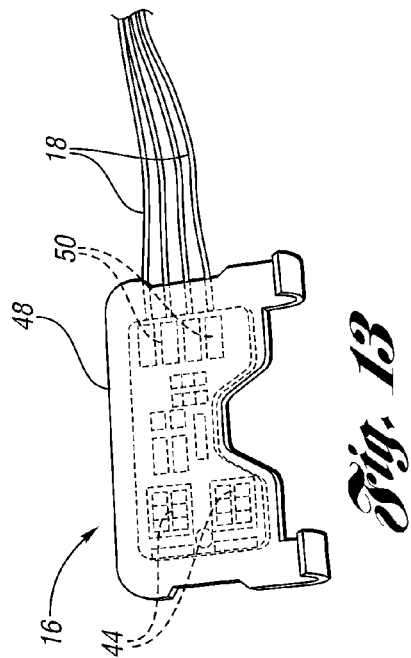

VEHICLE INLET FOR USE IN CHARGING A BATTERY OF AN ELECTRIC VEHICLE (EV) OR A HYBRID ELECTRIC VEHICLE (HEV)

CROSS-REFERENCE TO RELATED APPLICATION

This application claims priority to U.S. Provisional Application Ser. No. 61/526,459 filed on Aug. 23, 2011, the disclosure of which is incorporated in its entirety by reference herein.

TECHNICAL FIELD

The following relates to a vehicle inlet for use in charging a battery of an electric vehicle (EV) or a hybrid-electric vehicle (HEV).

BACKGROUND

Automotive vehicles powered by an electric motor or an electric motor and a gasoline engine are commonly referred to as electric vehicles (EV) or hybrid-electric vehicles (HEV). As is well known in the art, such vehicles include batteries for supplying power to the electric motors thereof.

Electric and hybrid-electric vehicles typically provide for charging such batteries using an interface configured to rectify electrical power from a 120 volt or 240 volt alternating current (AC) utility power line for storage by the vehicle batteries. A vehicle inlet or receptacle is also provided for use in charging the batteries of an EV or HEV. Such a vehicle inlet or receptacle may be provided on a vehicle at a location (e.g., rear quarter panel) similar to that of a capped fuel filler in a gasoline powered vehicle.

To charge an EV or HEV batteries, a vehicle inlet or receptacle may be connected to a vehicle connector or plug, which may be part of a cord or cable and which also may be connected to a charging station. A vehicle inlet and vehicle connector together comprise a vehicle coupler. A vehicle inlet or receptacle may include illumination features to provide visual indications to a user when in operation.

In that regard, various features of electric vehicles, including couplers for vehicle battery charging, are shown in U.S. Patent Application Publication No. 2010/0204859 entitled "Electrically Powered Vehicle" and U.S. Patent Application Publication No. 2010/0207771 entitled "Inductively Coupled Power Transfer Assembly." Exemplary couplers for use in charging electric vehicle batteries are also shown in U.S. Patent Application Publication No. 2010/0246198 entitled "Illuminated Bezel Of Charge Port For Electric Vehicle" and U.S. Patent Application Publication No. 2010/0302781 entitled "Electric Charge Receptacle With Illumination Features."

Such prior art devices, however, lack additional illumination features for enhanced visual perceptibility by a user, and do not provide for flexibility in packaging. Thus, there exists a need for an improved vehicle inlet for use in charging a battery of an electric vehicle or a hybrid-electric vehicle. Such an improved vehicle inlet would provide a visual indication to a user when an ambient light level is less than a threshold level and/or when a cover for the vehicle inlet is open. As well, such a vehicle inlet would include an luminance ring and luminance engine configured for simple assembly in multiple locations on the vehicle inlet.

SUMMARY

According to one embodiment disclosed herein, a vehicle inlet is provided for use in charging a battery of an electric vehicle (EV) or a hybrid-electric vehicle (HEV). The vehicle inlet comprises a housing, a luminance engine comprising at least one light emitting diode, and a luminance member configured for attachment to the housing and for cooperation with the luminance engine. The luminance member is adapted for illumination by the at least one light emitting diode of the luminance engine based on an ambient light level having a value less than a threshold for a predetermined time period.

According to another embodiment disclosed herein, a vehicle inlet is provided for use in charging a battery of an electric vehicle (EV) or a hybrid-electric vehicle (HEV). The vehicle inlet comprises a housing comprising a cover moveable between an open and a closed position, a luminance engine comprising at least one light emitting diode, and a luminance member configured for attachment to the housing and for cooperation with the luminance engine. The luminance member is adapted for illumination by the at least one light emitting diode of the luminance engine to provide a visual indication to a user when the cover has a position other than the closed position.

According to a further embodiment disclosed herein, a vehicle inlet is provided for use in charging a battery of an electric vehicle (EV) or a hybrid-electric vehicle (HEV). The vehicle inlet comprises a housing, a luminance engine comprising a light emitting diode, and a luminance ring for attachment to the housing and the luminance engine. The luminance ring is to be illuminated by the light emitting diode of the luminance engine based on an ambient light level having a value less than a threshold level.

A detailed description of these embodiments of a vehicle inlet for use in charging a battery of an electric vehicle (EV) or a hybrid-electric vehicle (HEV) is set forth below together with accompanying drawings.

BRIEF DESCRIPTION OF THE DRAWINGS

FIG. 1 is a perspective view of a vehicle inlet for use in charging an electric vehicle (EV) or a hybrid-electric vehicle (HEV), the vehicle inlet having a luminance ring, as disclosed herein;

FIG. 2 is an exploded view of the vehicle inlet of FIG. 1 for use in charging an electric vehicle (EV) or a hybrid-electric vehicle (HEV), the vehicle inlet having a luminance ring, as disclosed herein;

FIG. 3-5 are front views of the vehicle inlet of FIG. 1 for use in charging an electric vehicle (EV) or a hybrid-electric vehicle (HEV), with an actuator lock shown in various positions, as disclosed herein;

FIG. 6 is a perspective view of a vehicle inlet for use in charging an electric vehicle (EV) or a hybrid-electric vehicle (HEV), with a wire route cover, as disclosed herein;

FIGS. 7-11 are reverse views of the vehicle inlet of FIG. 1 for use in charging an electric vehicle (EV) or a hybrid-electric vehicle (HEV), with a wire route cover shown in various positions, as disclosed herein;

FIG. 12 is a perspective view of a luminance ring and luminance engine for use in a vehicle inlet as disclosed herein;

FIG. 13 is a perspective view of a luminance engine for use in a vehicle inlet as disclosed herein;

FIG. 14 is a perspective view of a housing and luminance engine for use in a vehicle inlet as disclosed herein; and FIG. 15 is a front view of a housing and luminance ring for use in a vehicle inlet as disclosed herein.

DETAILED DESCRIPTION

With reference to FIGS. 1-15, a more detailed description of embodiments of a vehicle inlet for use in charging a battery of an electric vehicle (EV) or a hybrid-electric vehicle (HEV) will be described. For ease of illustration and to facilitate understanding, like reference numerals have been used herein for like components and features throughout the drawings.

As noted above, electric and hybrid-electric vehicles typically provide for charging the vehicle batteries using a vehicle inlet or receptacle. Such a vehicle inlet or receptacle may be provided on a vehicle at a location (e.g., rear quarter panel) similar to that of a capped fuel filler in a gasoline powered vehicle. To charge an EV or HEV batteries, a vehicle inlet or receptacle may be connected to a vehicle connector or plug, which may be part of a cord or cable and which also may be connected to a charging station. A vehicle inlet and vehicle connector together comprise a vehicle coupler. A vehicle inlet or receptacle may include illumination features to provide visual indications to a user when in operation.

Various features of electric vehicles, including couplers for vehicle battery charging, are shown in U.S. Patent Application Publication No. 2010/0204859 entitled "Electrically Powered Vehicle" and U.S. Patent Application Publication No. 2010/0207771 entitled "Inductively Coupled Power Transfer Assembly." Exemplary couplers for use in charging electric vehicle batteries are also shown in U.S. Patent Application Publication No. 2010/0246198 entitled "Illuminated Bezel Of Charge Port For Electric Vehicle" and U.S. Patent Application Publication No. 2010/0302781 entitled "Electric Charge Receptacle With Illumination Features."

There exists a need, however, for an improved vehicle inlet for use in charging a battery of an electric vehicle or a hybrid-electric vehicle. Such an improved vehicle inlet would provide a visual indication to a user when an ambient light level is less than a threshold level and/or when a cover for the vehicle inlet is open. As well, such a vehicle inlet would include a luminance ring and luminance engine configured for simple assembly in multiple locations on the vehicle inlet.

Referring now to FIG. 1, a perspective view of a vehicle inlet (10) for use in charging an electric vehicle (EV) or a hybrid-electric vehicle (HEV) is shown. FIG. 2 depicts an exploded view of the vehicle inlet (10) of FIG. 1. As seen therein, the vehicle inlet or receptacle (10) comprise a luminance ring (12) and cover (14). The vehicle inlet (10) may further comprise a luminance engine (16) and housing (22). In that regard, the housing (22) may be adapted for any type of vehicle inlet (10), such as an IEC type connector. The housing (22) includes a wall (24) having an outer surface area and which may be provided with a substantially cylindrical shape.

Still referring to FIGS. 1 and 2, the luminance ring (12) may be illuminated by the luminance engine (16) to indicate a proper connection between a vehicle connector (not shown) and the vehicle inlet (10). In that regard, the vehicle inlet (10) may further comprise an actuator (26), which may include a locking cam (not shown), for locking a vehicle connector (not shown) into the vehicle inlet (10). FIG. 3-5 illustrate front views of the vehicle inlet (10) of FIG. 1. As seen therein, for improved manufacturing ease and/or packaging configuration flexibility, the vehicle inlet (10) may be configured to provide multiple locations or positions for the actuator (26), such as according to IEC standard 62196-2.

Referring still to FIGS. 1 and 2, the vehicle inlet (10) may further comprise seals (28, 30), a seal close-out ring (32), a spring tab (34), a pin (36), bushings (40), and male terminals (42). In that regard, the spring tab (34) and pin (36) are configured to cooperate with the cover (14). In such a fashion, the cover (14) may be moveable (e.g., rotatable) between an open and a closed position. FIGS. 6-11 illustrate perspective and reverse views of the vehicle inlet (10) with a wire route cover (20). As seen therein, for improved manufacturing ease and/or packaging configuration flexibility, the wire route cover (20) may be configured or provided with multiple positions for routing wires which may be attached to male terminals (42).

Referring now to FIG. 12, a perspective view of the luminance ring (12) and the luminance engine (16) for use in the vehicle inlet (10) are shown. In that regard, the luminance ring (12), which may comprise a clear or translucent polycarbonate material, may also be illuminated by the luminance engine (16) in different manners (e.g., different colors, flashing/blinking, frequency of flashing/blinking) to provide additional visual information regarding the status or state of the EV or HEV battery charging process (e.g., charging in progress, percent charged, charging complete).

As well, the luminance ring (12) may also be constantly illuminated by the luminance engine (16) or illuminated based on certain vehicle conditions in order to act as an indicator of the location of the vehicle inlet (10) on the vehicle. For example, the luminance ring (12) may be illuminated by the luminance engine (16) whenever the vehicle is off, when the cover (14) of the vehicle inlet (10) is opened, either fully opened or in any position other than fully closed, or at a threshold level of ambient light as may be determined by a photo sensor.

FIG. 13 illustrates a perspective view of the luminance engine (16) for use in the vehicle inlet (10). As seen therein, the luminance engine (16) may comprise one or more light emitting diodes (LED) (44), which may be encased in a clear or translucent polycarbonate material. In that regard, the luminance engine (16) may be provided with LEDs of different colors to provide the functionality described above. The luminance engine (16) may also be provided with low voltage wires (18) for providing power and/or control signals, and which may also be routed by the cover (20) (see FIGS. 6-11). FIG. 14 shows a perspective view of the luminance engine (16) attached to the housing (22) with the low voltage wires (18) extending therefrom.

Referring now to FIG. 15, a front view is shown of the housing (22) and the luminance ring (12) of the vehicle inlet (10). As seen therein, and with continuing reference to FIGS. 1, 2 and 12, the luminance engine (16) may be snapped or molded to the luminance ring (12), which may then be snapped into the housing (22) of the vehicle inlet (10). Other assembly or configuration methods known in the art may also be used, such as molding the luminance engine (16) in the housing (22) of the vehicle inlet (10).

Referring again to FIGS. 1 and 2, multiple luminance engines (16) may be employed, which may be equipped (e.g., with multiple and/or different color LEDs) and operated in such a fashion as to provide the functionality described above. Alternatively, for manufacturing ease and flexibility, a single luminance engine (16) may be provided at any of multiple possible locations relative to the luminance ring (12) and the housing (22) of the vehicle inlet (10), which positions may correspond to the multiple possible locations or positions of actuator (26) previously described. In that regard, the connected luminance ring (12) and luminance engine (16) could be rotated to any of multiple positions and then snapped into the housing (22) of the vehicle inlet (10), depending upon the desired position of the luminance engine (16).

While shown in FIGS. 2 and 12 as a thin or narrow band inserted into the housing (22) of the vehicle inlet (10), it should be noted that the luminance ring (12) may also be provided with alternative configurations. For example, as seen in FIG. 1, the housing (22) of the vehicle inlet (10) includes an outer wall (24). The luminance ring (12) could be provided with a cylindrical shape of greater width and be inserted into the outer wall (24) of the vehicle inlet (10). In such a fashion, the luminance ring (12) could comprise half or more of the surface of the outer wall (24) of the vehicle inlet (10), thereby providing for greater visibility of the luminance ring (12) when illuminated by the luminance engine (16) in any fashion as described herein.

Referring again to FIGS. 1 and 2, the vehicle inlet (10) for use in charging a battery of an EV or HEV may comprise a housing (22), a luminance engine (16) comprising at least one light emitting diode (44), and a luminance member (12) configured for attachment to the housing (22) and for cooperation with the luminance engine (16). The luminance member (12) is adapted for illumination by the at least one light emitting diode (44) of the luminance engine (16) based on an ambient light level having a value less than a threshold for a predetermined time period, which may be determined by a sensor.

The housing (22) may comprise a cover (14) movable between an open and a closed position, and the luminance member (12) may be further adapted for illumination by the at least one light emitting diode (44) of the luminance engine (16) to provide a visual indication to a user when the cover has a position other than the closed position. The luminance member (12) may comprise a ring of a substantially clear or translucent polycarbonate material. Alternatively, the luminance member (12) may comprise a cylinder of substantially clear or translucent polycarbonate material, and may be configured to form substantially a majority of a surface area of the wall (24) of the housing (22) in order to provide increased visibility of the luminance member (12) when illuminated by the at least one light emitting diode (44) of the luminance engine (16).

Moreover, the luminance engine (16) may comprise a plurality of light emitting diodes (44), and each of the diodes (44) may be configured for emitting light having a different color. The LEDs (44) may be adapted to provide a visual indication to a user by flashing or emitting light having different colors, and the visual indication may represent a battery charging state, status or condition of charging in progress, a level of charge, or charging complete. The housing (22) and the luminance member (12) may each also include a plurality of locations thereon adapted for cooperation with the luminance engine (16), and may each be configured to cooperate with a plurality of luminance engines (16).

As well, the vehicle inlet (10) may further comprise an actuator (26) configured for locking a vehicle charging connector (not shown) to the vehicle inlet (10), and the luminance member (12) may be further adapted for illumination by the at least one light emitting diode (44) of the luminance engine (16) to provide a visual indication to a user of a proper connection between the vehicle inlet (10) and the charging connector. The luminance engine (16) may further comprises a housing (48) for the plurality of light emitting diodes (44). The housing (48) may comprise a substantially clear or translucent polycarbonate material, as well as a plurality of leads (50) configured for receiving low voltage control signals for use in controlling the plurality of light emitting diodes (44). The luminance member (12) may still further be adapted for illumination by the at least one light emitting diode (44) of the luminance engine (16) when the EV or HEV has an "off" condition.

As is readily apparent from the foregoing, a improved vehicle inlet (10) for use in charging a battery of an electric vehicle (EV) or a hybrid-electric vehicle (HEV) has been described. The embodiments of the vehicle inlet (10) described provide a visual indication to a user when an ambient light level is less than a threshold level and/or when a cover (14) for the vehicle inlet (10) is open. As well, the vehicle inlet (10) provides a luminance ring (12) and luminance engine (16) configured for simple assembly in multiple locations. The luminance ring (12) and luminance engine (16) thus overcome the problems in the prior art of a single LED mounted at one location, limited visual perceptibility, restrictive packaging and an inability to modify illumination features.

While various embodiments of a vehicle inlet for use in charging a battery of an electric vehicle (EV) or a hybrid-electric vehicle (HEV) have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A vehicle inlet for use in charging a battery of an electric vehicle (EV) or a hybrid-electric vehicle (HEV), the vehicle inlet comprising:
    a housing comprising a cover moveable between an open and a closed position;
    a luminance engine comprising at least one light emitting diode; and
    a luminance member configured for attachment to the housing and for cooperation with the luminance engine;
    wherein the luminance member is adapted for illumination by the at least one light emitting diode of the luminance engine based on an ambient light level having a value less than a threshold for a predetermined time period, and wherein the luminance member is further adapted for constant illumination by the at least one light emitting diode of the luminance engine when the vehicle is off and the cover has a closed position, in order to act as a visual indicator of a location of the vehicle inlet on the vehicle.

2. The vehicle inlet of claim 1 wherein the luminance member is further adapted for illumination by the at least one light emitting diode of the luminance engine to provide a visual indication to a user when the cover has a position other than the closed position.

3. The vehicle inlet of claim 1 wherein the luminance member comprises a ring of one of a substantially clear polycarbonate material and a translucent polycarbonate material.

4. The vehicle inlet of claim 1 wherein the luminance member comprises a cylinder of one of a substantially clear polycarbonate material and a translucent polycarbonate material, and the luminance member is configured to form substantially a majority of a surface area of a wall of the housing to provide increased visibility of the luminance member when illuminated by the at least one light emitting diode of the luminance engine.

5. The vehicle inlet of claim 1 wherein the luminance engine comprises a plurality of light emitting diodes, each of the diodes configured for emitting light having a different color.

6. The vehicle inlet of claim 5 wherein the plurality of light emitting diodes are adapted to provide a visual indication to a user by at least one of flashing and emitting light having different colors, the visual indication representing a battery charging condition of at least one of charging in progress, a level of charge, and charging complete.

7. The vehicle inlet of claim 1 wherein the housing and the luminance member each include a plurality of locations thereon adapted for cooperation with the luminance engine, and wherein the housing and luminance member may each be configured to cooperate with a plurality of luminance engines.

8. A vehicle inlet for use in charging a battery of an electric vehicle (EV) or a hybrid-electric vehicle (HEV), the vehicle inlet comprising:
a housing comprising a cover moveable between an open and a closed position;
a luminance engine comprising at least one light emitting diode; and
a luminance member configured for attachment to the housing and for cooperation with the luminance engine;
wherein the luminance member is adapted for illumination by the at least one light emitting diode of the luminance engine to provide a visual indication to a user when the cover has a position other than the closed position, and wherein the luminance member is further adapted for constant illumination by the at least one light emitting diode of the luminance engine when the vehicle is off and the cover has a closed position, in order to act as a visual indicator of a location of the vehicle inlet on the vehicle.

9. The vehicle inlet of claim 8 wherein the luminance member comprises a cylinder of one of a clear polycarbonate material and a translucent polycarbonate material, and the luminance member is configured to form substantially a majority of a surface area of a wall of the housing to provide increased visibility of the illumination member when illuminated by the at least one light emitting diode of the luminance engine.

10. The vehicle inlet of claim 9 wherein the luminance member is further adapted for illumination by the at least one light emitting diode of the luminance engine based on an ambient light level having a value less than a threshold for a predetermined time period.

11. The vehicle inlet of claim 8 wherein the luminance member comprises a ring of one of a substantially clear polycarbonate material and a translucent polycarbonate material.

12. The vehicle inlet of claim 8 wherein the luminance engine comprises a plurality of light emitting diodes, each of the diodes configured for emitting light having a different color.

13. The vehicle inlet of claim 12 wherein the plurality of light emitting diodes are adapted to provide a visual indication to a user by at least one of flashing and emitting light having different colors, the visual indication representing a battery charging condition of at least one of charging in progress, a level of charge, and charging complete.

14. The vehicle inlet of claim 8 wherein the housing and the luminance member each include a plurality of locations thereon adapted for cooperation with the luminance engine, and wherein the housing and luminance member may each be configured to cooperate with a plurality of luminance engines.

15. A vehicle inlet for use in charging a battery of an electric vehicle (EV) or a hybrid-electric vehicle (HEV), the vehicle inlet comprising:
a housing comprising a cover movable between an open and a closed position;
a luminance engine comprising a light emitting diode; and
a luminance ring for attachment to the housing and the luminance engine;
wherein the luminance ring is adapted for illumination by the light emitting diode of the luminance engine based on an ambient light level having a value less than a threshold level, and wherein the luminance ring is further adapted for constant illumination by the light emitting diode of the luminance engine when the vehicle is off and the cover has a closed position, in order to act as a visual indicator of a location of the vehicle inlet on the vehicle.

16. The vehicle inlet of claim 15 wherein the luminance ring is further to be illuminated by the light emitting diode of the luminance engine to provide a visual indication to a user when the cover is open.

17. The vehicle inlet of claim 15 wherein the luminance ring comprises a cylinder of polycarbonate material, and the luminance ring forms most of a surface area of a wall of the housing to provide increased visibility of the luminance ring when illuminated by the light emitting diode of the luminance engine.

18. The vehicle inlet of claim 15 wherein the luminance engine comprises a plurality of light emitting diodes, each of the diodes for emitting light having a different color.

19. The vehicle inlet of claim 18 wherein the plurality of light emitting diodes provide a visual indication to a user by flashing or emitting light having different colors, the visual indication representing a battery charging state of charging in progress, a level of charge, or charging complete.

20. The vehicle inlet of claim 15 wherein the housing and the luminance ring each include a plurality of locations thereon for attachment to the luminance engine, and wherein the housing and luminance ring may each be attached to a plurality of luminance engines.

* * * * *